United States Patent [19]

Nakagawa

[11] Patent Number: 4,959,678
[45] Date of Patent: Sep. 25, 1990

[54] AUTOMATIC FOCUSING CAMERA
[75] Inventor: Tadashi Nakagawa, Chiba, Japan
[73] Assignee: Seikosha Co., Ltd., Tokyo, Japan
[21] Appl. No.: 444,070
[22] Filed: Nov. 30, 1989
[30] Foreign Application Priority Data
  Nov. 30, 1988 [JP]  Japan .................. 63-303529
[51] Int. Cl.$^5$ ............................................ G03B 13/00
[52] U.S. Cl. .................................................. 354/403
[58] Field of Search ............. 354/400, 402, 403, 408, 354/195.1

[56] References Cited
U.S. PATENT DOCUMENTS
  4,816,856  3/1989  Hamada et al. ............... 354/402
  4,825,239  4/1989  Suda et al. ...................... 354/402
  4,827,303  5/1989  Tsuboi .............................. 354/403

Primary Examiner—L. T. Hix
Assistant Examiner—David M. Gray
Attorney, Agent, or Firm—Jordan and Hamburg

[57] ABSTRACT

An automatic focusing camera includes a shutter; a range finding circuit for measuring the distances to a plurality of objects and for providing time base electrical signals corresponding thereto, the circuit including n parallel luminous elements which transmit light to the objects; a range and element position data arithmetic circuit for producing range data to the objects and element position data of active ones of the n elements, in response to the time base electrical signals; an object speed arithmetic circuit for producing time base speed signals corresponding to the object speeds, in response to the range data and the element position data; a shutter control circuit for controlling operation of the shutter in accordance with the object speeds at such time; object speed processors for supplying output signals corresponding to optimum exposure times and stop values of respective objects in response to the time base speed signals and luminances of the objects; and object speed rank order decision circuit for comparing the output signals from the object speed processors and for determining the order of ranking of the object speeds relative to each other and an object speed data organizing circuit for controlling the shutter control circuit in response to the object speed rank order decision circuit so as to control the shutter control circuit means in accordance with the highest speed object.

43 Claims, 2 Drawing Sheets

FIG. I

AUTOMATIC FOCUSING CAMERA

BACKGROUND OF THE INVENTION

The present invention relates to an automatic focusing camera, and more particularly, is directed to an automatic focusing camera in which the shutter speed corresponding to the opening and closing of the shutter aperture is determined from the speeds of a plurality of moving objects.

Conventionally, as disclosed in Japanese Patent Application No. SHO61-309531, entitled "Automatic Focusing Unit for Still Camera", the distance to a moving object is observed at a plurality of predetermined times and the position of the object at the time of opening and closing the shutter aperture is determined from the observed range data.

Also, a method in which ranges to the center, as well as to left and right, objects are observed and the focal point is determined based on these ranges to the center, left and right objects, has been disclosed in Japanese Patent Application No. SHO63-199368 entitled "Automatic Focusing Camera".

Furthermore, in Japanese Patent Publication No. 57-153610, incident light from an object is received at two light-receiving points and the light path of the object is determined by solid state elements disposed in parallel, thus forming a range-finding circuit having no mechanical driving system for focusing a lens.

In Japanese Patent Application No. SHO63-199368 and the Japanese Patent Publication, a plurality of light-receiving elements or luminous elements which are disposed in parallel are used as one side of a range finder and the active state on a light path of light-receiving elements or luminous elements which are disposed in parallel for the light is used as another side of the range finder, and a measured value is determined by the active states of elements provided on one side and the other side which are in accord with each other.

In the abovementioned three patent applications, the desired automatic focusing operation is performed from obtained range data or range data of a plurality of objects.

The arrangement of Japanese Patent Application No. SHO63-199368 has been provided for the purpose of preventing so-called center missing when the release button is pushed down to a first stroke to obtain a focused state for both left and right objects so as to perform a focusing operation, even in the case where an object does not exist at the center, and when the pertinent shutter opration cannot be performed when the object is moving.

Also, in Japanese Patent Application No. SHO63-309531 the distance to a moving object at the time of opening and closing the shutter aperture may be determined from the previously-determined distance to the moving object, and in the Japanese Patent Publication, the distance to an object may be obtained but the speed of the object cannot be obtained. Accordingly, a still picture of an object cannot be taken at an appropriate shutter speed.

SUMMARY OF THE INVENTION

It is an object of the present invention to provide an automatic focusing camera which is able to perform a pertinent focusing operation, and opening and closing of a shutter aperture for a plurality of moving objects by creating range data on a time base to a plurality of objects and speed data from element position data and by opening and closing the shutter aperture with the speed data for a desired object.

An automatic focusing camera according to the present invention is provided with a range-finding means in which the distance to an object is measured with first, second . . . and nth elements which are disposed in parallel and is output as an electrical signal on a time base, comprising: range and element position data arithmetic means which outputs range data to the object and element position data of the first, second, . . . and nth elements under active state from an electrical signal on the time base; and object speed arithmetic means that outputs speed data obtained by computing the speed of the object from the range data and element position data on the time base.

An automatic focusing camera according to the present invention is provided with a range-finding means in which the distance to an object is measured with first, second, . . . and nth elements which are disposed in parallel and is output as an electrical signal on a time base, comprising: range and element position data arithmetic means which outputs range data to the object and element position data of the first, second, . . . and nth elements under active state from an electrical signal on the time base; object speed arithmetic means that outputs speed data obtained by computing the speed of the object from the range data and element position data on the time base; and object speed rank order judging means which compares a plurality of speed data related to a plurality of objects that are output from the object speed arithmetic means with one another, thereby to judge the speed rank order of the plurality of objects.

An automatic focusing camera according to the present invention is further composed of shutter control means which controls a shutter in accordance with the speed of the object and which is capable of image pickup at the time of opening and closing a shutter aperture.

DESCRIPTION OF THE PREFERRED EMBODIMENTS

Figure 1:
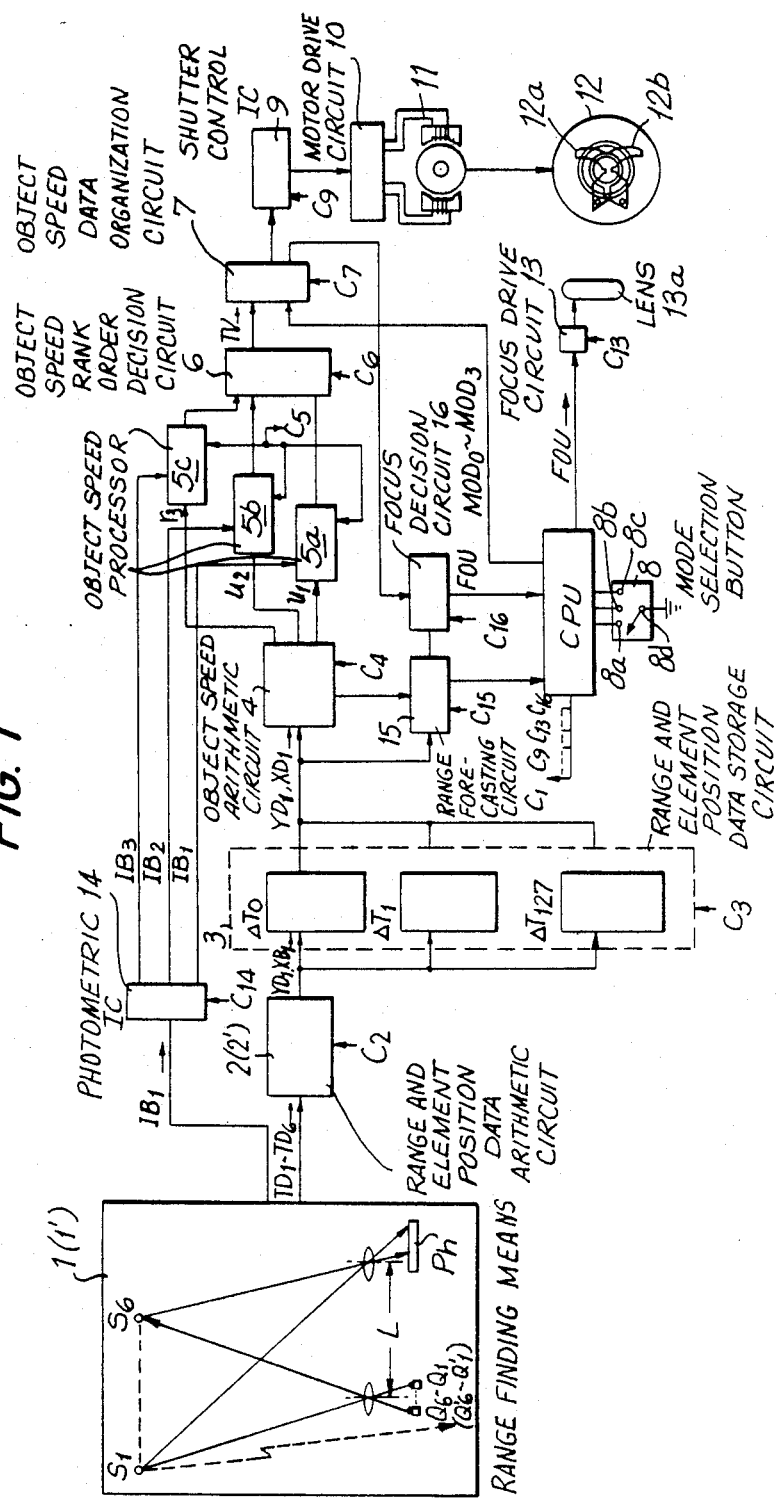
FIG. 1 is a block diagram of an automatic focusing camera according to one embodiment of the present invention.

An embodiment of an automatic focusing camera according to the present invention will be described in detail hereafter with reference to the drawings.

An automatic focusing camera according to the present invention is composed of a range-finding means 1, a range and element position data arithmetic circuit 2, a range and element position data storage circuit 3, an object speed arithmetic circuit 4, an object speed rank order decision circuit 6, an object speed data organizing circuit 7 and a shutter control IC 9.

The range-finding means 1 is formed of first, second, . . . and nth luminous elements $Q_1$, $Q_2 \sim Q_6$ and an element position detecting light-receiving element Ph. For purposes of explanation only, $n=6$. Further, L is the base length between the luminous elements and element Ph. The luminous elements $Q_1$, $Q_2 \sim Q_6$ emit light in succession by a scanning pulse (not shown) in a period of 60 nS which is sent out from a microcomputer (hereinafter referred to as just a CPU) within each time period, for example, period $\Delta T0 \sim \Delta T1$, from each zero time point $\Delta T0$, $\Delta T1$ . . . to the n time point $\Delta Tn$. For purposes of explanation only, n ranges from 0 to 127, and each period is 2,160 nS. As an aside, the CPU controls, through control lines Cn (n is at $1 \sim 9$ and $13 \sim 16$), each circuit shown with a numeral as a subscript. When the light projected onto objects S1, S2, . . . and S6 by the emission of luminous elements Q1, Q2~Q6 is reflected by the objects S1, S2, . . . and S6 and received by the element position detecting light-receiving element Ph, electrical signals TD1~TD6 are sent out to the range and element position data arithmetic circuit 2. In this case, when the object S1 moves toward the object S2, an electrical signal TD3 is output between time points $\Delta T1 \sim \Delta T2$. Electrical signals TD1 and TD2 correspond to the object on the left side, TD3 and TD4 correspond to the object at the center and TD5 and TD6 correspond to the object on the right side. The electrical signals TD1 . . . TD6 include element position data shown with subscripts corresponding to the objects and range signals, depending on the intensity of electrical signals TD1 . . . TD6.

Alternatively, if the luminous elements of an alternative range-finding means 1' are composed of light-receiving elements Q'1~Q'6, reflected light (shown with a dotted arrow) from the object S1 is scanned by a scanning pulse and detected by light-receiving elements Q'1~Q'6. The element position detecting element Ph is constructed to operate with the reflected light at first . . . sixth incident angles, and the scanning pulse is sent out 6 times with six pulses as one set. Accordingly, they become digital electrical signals TD1~TD36 (not shown) created within the period $\Delta T0 \sim \Delta T1$.

Referring to the first-described embodiment in FIG. 1, input electrical signals TD1~TD6 are input to the range and element position data arithmetic circuit 2. The intensities of the electrical signals TD1~TD6 are converted to digital signals by an A/D conversion circuit (not shown) provided in range and element position data arithmetic circuit 2 and become range data YD1-~YD6. The range data YD1~YD6 have attributes of element position data XD1~XD6, and the range and element position data YD1, XD1 . . . YD6, XD6 are stored in range and element position data storage circuit 3. Smaller numbers among the subscripts of the range data YD1 . . . YD6 and the element position data XD1 . . . XD6 correspond to the object on the left side.

In the alternative embodiment of light-receiving elements Q'1~Q'6, there are 36 scanning pulses, and electrical signals TD1~TD36 (not shown) are sent to a range and element position data arithmetic circuit 2'. The object S1 is assigned with electrical signals TD1~TD6, the object S2 is assigned with electrical signals TD7~TD12, and so on. Among respective sets of electrical signals, smaller numbers of the subscripts is for long range, and there are provided 6 stages of long and short zones.

Figure 2:
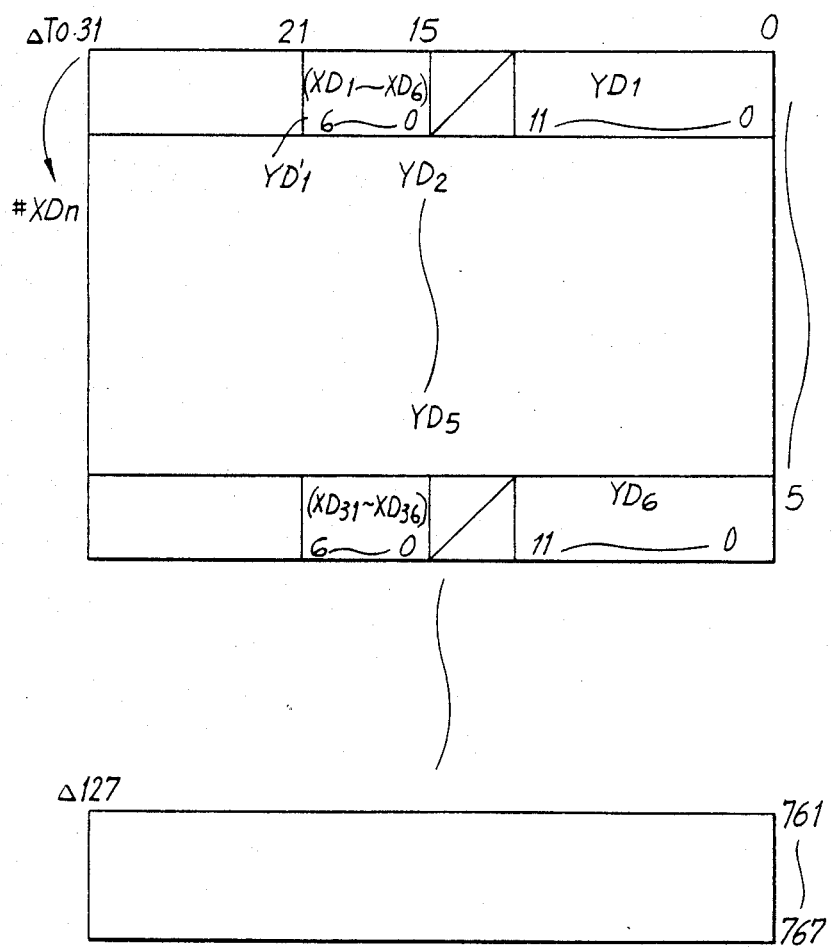
FIG. 2 is a data area composition drawing of a range and element position data storage circuit.

In the range and element position data storage circuit 3, one word is composed of 0~31 bits, and 0~767 words are included, as shown in FIG. 2.

Each memory area $\Delta T0 \sim \Delta T127$ on the time base has a memory capacity of 0~5 words and is retrieved with subareas YD1~YD6. The subareas YD1~YD6 have range data YD1~YD6 having the same names stored therein, and each has a storage capacity of approximately 40 m at one bit per one centimeter, but 15 m or over is practically processed as the most remote object.

When the light-receiving elements Q'1~Q'6 are used, the range data having the same names are stored in subareas XD1~XD36 provided at every 15~20 bits. In the memory, the 15th bit is XD6, the 20th bit is XD1, and XD6 is the shortest zone. Respective bits in the subareas XD1~XD36 become range data YD'1~YD'6 and stored word positions show the element position data XD1~XD36. For example, when XD14 is stored in the third scanning, XD14 is stored at the second word in the range data YD'3 (zone for longer range), so it becomes element position data XD3 (word composition is started from 0 word).

Further, bits 21 to 31 of each word are used as a work memory.

The object speed arithmetic circuit 4 reads the range data YD1 . . . and the element position data XD1 . . . stored in the range and element position data storage circuit 3 and computes the change of position of the objects S1~S6 with the change on the time base. Computed speed data v1, v2 and v3 are sent to first, second and third object speed processors 5a, 5b and 5c. The first object speed processor 5a processes the object on the left side, the second object speed processor 5b processes the object at the center, and the third object speed processor processes the object on the right side. The first, second and third object speed processors 5a, 5b and 5c receive speed data v1, v2 and v3 that are input from the object speed arithmetic circuit 4 and object luminances IB1, IB2 and IB3 that are measured photometrically with a photometric IC 14, and output optimum exposure times TV1 . . . and stop values AV1 . . . of respective objects to the object speed data organizing circuit 7, taking precedence of those that have higher speed rank order.

Also, the object speed arithmetic circuit 4 sends computed speed data to a range forecasting circuit 15. The range forecasting circuit 15 receives input speed data and the position of the object, and forecasts the location of the object existing in a scene at a predetermined time (using element position data XD1 . . . ).

The object speed rank order decision circuit 6 receives the speed data v1, v2 and v3 from the first, second and third object speed processors 5a, 5b and 5c, and decides the rank order of the speed data v1, v2 and v3.

The shutter control IC controls the opening and closing of the shutter aperture and also sends out data for focusing to a focus decision circuit 16. Those input data that are required for creating data for control and focusing are organized in the object speed data organizing circuit 7.

The object speed data organizing circuit 7 is supplied with that data that is required for creating data for the control of the shutter control IC and for focusing by exposure times TV1 . . . , stop values AV1 . . . , and a mode signal MOD for objects having a higher speed rank order that are input from the above-mentioned object speed rank order decision circuit 6.

A mode selection button 8 is composed of pushbuttons, and a reference potential point is not usually connected to terminals 8a, 8b and 8c. With the first pushbutton operation, the terminal 8a is connected to a reference potential point, the terminal 8b is connected during the second pushbutton operation and the terminal 8c is connected during the third pushbutton operation to the reference potential point. Since data that shows which effective object has been sent to the CPU at the time forecast in the range forecasting circuit 15, the CPU sends out a mode signal MOD 0 to the shutter control IC 9 when the mode selection button 8 is not operated. In the case of mode signal MOD 0, an average mode is obtained, and all the operations are performed on the central object. When the terminal 8a is the reference potential point, the left object has priority. The central object has priority at the terminal 8b and the right side object has priority at the terminal 8c. However, a stop value AVn allowed from the focal point depth is determined from mode signals MOD1~MOD3 with respect to the object which is forecast to exist in a scene at the time of opening and closing the shutter aperture, exposure times TV1... and stop values AV1... for objects having higher speed rank order are determined, and shutter blades 12a and 12b of the shutter 12 are opened and closed through a motor drive circuit 10.

Further, a focus drive circuit 13 performs extension of a lens 13a by a focus signal FOU from the CPU. This focus signal FOU is created in focus decision circuit 16.

In operation, electrical signals TD1... TD6 formed in the range-finding means 1 are input to the range and element position data arithmetic circuit 2. Since the scanning period is 60 nS, the scanning is completed in 360 nS in the case of electrical signals TD1 and TD6. However, time for conversion is required after the scanning because of the A/D conversion operation. The range and element position data arithmetic circuit 2' being of digital processing, time for A/D conversion is not required, but the period of $\Delta T0$ becomes 36 times 60 nS, viz., 2,160 nS. Accordingly, when it is assumed that the period of $\Delta T0$ is 2,160 nS for both, there is an allowance of approximately 1 mS for the A/D conversion operation for electrical signals TD1~TD6.

When electrical signals TD1~TD36 from the range-finding circuit 1' are sent to the range and element position data arithmetic circuit 2' and the object S1 is located in the zone 3, 17 bits of word 0 of the memory area $\Delta T0$ are activated. When the object S1 moves to the position of the object S2 so it is located in the zone 3 after 2,160 nS, 17 bits at the 0th word of the memory area $\Delta T1$, that is, at the 7th word of the range and element position data storage circuit 3 are activated. Furthermore, since all of subareas XD1~XD6 at the 0th word of the memory area $\Delta T3$ corresponding to the object S1 are at "0", the object S1 does not exist after the next 2,160 nS, it means that the object S1 moves to the location of the object S2 in 2,160 nS. The speed of the object Sn may be computed from the numeric values of YDn and XDn of the memory areas $\Delta T0 \sim \Delta T127$.

Also, when the object S1 retreats along a remote direction, the 18th bit of the 0th word of the memory area T1 after 2,160 nS and after 17 bits of the 0th word of the memory area TD, is activated. Furthermore, if the object S1 continues to retreat even after 2,160 nS, the 19th bit of the 0th word of the memory area $\Delta T3$ is activated. Therefore, the speed at which the object S1 retreats may be computed.

Since the period of $\Delta T0$ is 2,160 nS, the time required up to $\Delta T127$ is 274 mS. When the time required to open and close the shutter aperture in advance after the shutter button is pushed down is set at 350 mS, the timewise process for forming the storage operation is sufficient.

When it is forecast that the object on the right side appears from the scene on the right side 350 mS after the shutter button is pushed down in the case when the terminal 8c is connected to the reference potential point by operating the mode selection button 8, the mode signal MOD3 of the object on the right side is not sent out. As a result, mode signals MOD1 and MOD2 only are sent to the shutter control IC 9. The shutter control IC 9 controls the motor drive circuit with high speed object exposure times TV1 and TV2 and stop values AV1 and AV2 such as the exposure time TV1 and stop values AV1~AV2 (intermediate values sometimes) allowed by the exposure time TV1.

In the above embodiment, the reflected light of the light projected onto an object from luminous elements Q1~Q6 is received by the position detection light-receiving element Ph, but the light may be projected onto the object at first through sixth angles with the position detection light-receiving element Ph as a luminous element.

Also, the present invention may be executed in an equivalent manner by using a system in which a signal passing through a photographing lens is detected and an automatic focusing detection signal is output.

The automatic focusing camera according to the present invention is composed of an automatic focusing camera provided with a range-finding means in which the distance to an object is measured with first, second, ... and nth elements which are disposed in parallel and is output as an electrical signal on a time base, comprising: range and element position data arithmetic means which outputs range data to the object and element position data of the first, second, ... and nth elements under active state from an electrical signal on the time base; and object speed arithmetic means that outputs speed data obtained by computing the speed of the object from the range data and element position data on the time base. Accordingly, the speed of an object may be computed from range data and element position data on the time base.

Also, an automatic focusing camera according to the present invention is provided with a range-finding means in which the distance to an object is measured with first, second, ... and nth elements which are disposed in parallel and is output as an electrical signal on a time base, comprising: range and element position data arithmetic means which outputs range data to the object and element position data of first, second, ... and nth elements under active state from an electrical signal on the time base; object speed arithmetic means that outputs speed data obtained by computing the speed of the object from the range data and element position data on the time base; and object speed rank order decision means which compares a plurality of speed data related to a plurality of objects that are output from the object speed arithmetic means with one another, thereby to judge the speed rank order of the plurality of objects. Accordingly, it is possible to compute respective speeds of a plurality of objects and to judge which is the fastest object among respective objects.

Furthermore, since there is provided a shutter control means which controls a shutter in accordance with the speed rank order of the plurality of objects and which is capable of image pickup at the time of opening and closing the shutter aperture, it is possible to open and close the shutter aperture at the maximum speed and stop value from the speeds of the plurality of objects.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. An automatic focusing camera comprising:
   range finding means for measuring the distance of said camera to an object and for providing a time base electrical signal corresponding thereto, said range finding means including first through nth elements disposed in parallel to each other which measure said distance;
   range and element position data arithmetic means for producing range data of the camera to the object and for producing element position data of active ones of said first through nth elements, in response to said time base electrical signal; and
   object speed arithmetic means for producing a time base speed signal corresponding to the speed of said object in response to said range data and said element position data.

2. An automatic focusing camera according to claim 1, wherein said elements are luminous elements that transmit light to said object.

3. An automatic focusing camera according to claim 2, wherein said range finding means further includes element position detecting light receiving means for receiving said transmitted light reflected from said object and for producing said time base electrical signal in response thereto.

4. An automatic focusing camera according to claim 2, wherein there are six said luminous elements.

5. An automatic focusing camera according to claim 1, wherein said elements include light receiving elements which detect light reflected from said object.

6. An automatic focusing camera according to claim 1, wherein said range and element position data arithmetic means includes analog-to-digital converter means for converting said time base electrical signal to a digital signal containing said range data and said element position data, in correspondence with the intensity of said time base electrical signal.

7. An automatic focusing camera according to claim 1, further including range and element position data storage means for storing said range data and said element position data from said range and element position data arithmetic means.

8. An automatic focusing camera according to claim 1, wherein said object speed arithmetic means includes means for computing the change of position of said object with a change along a time base, in response to said range data and said element position data, so as to produce said time base speed signal.

9. An automatic focusing camera according to claim 1, further including range forecasting means for forecasting the position of said object in a scene at a predetermined future time, in response to said time base speed signal and said element position data.

10. An automatic focusing camera according to claim 9, further including a shutter capable of opening and closing a shutter aperture, and shutter control means for controlling opening and closing of said shutter in accordance with the speed of said object at such time.

11. An automatic focusing camera according to claim 10, further including central processing means for controlling said shutter control means in response to said range forecasting means.

12. An automatic focusing camera according to claim 11, further including a camera lens and focus drive means for controlling focusing of said lens.

13. An automatic focusing camera according to claim 12, further including focus decision means for producing a focus signal in response to said shutter control means, said central processing means supplying said focus signal from said focus decision means to said focus drive means.

14. An automatic focusing camera according to claim 1, further including a shutter capable of opening and closing a shutter aperture, and shutter control means for controlling opening and closing of said shutter in accordance with the speed of said object at such time.

15. An automatic focusing camera comprising:
    range finding means for measuring the distances of said camera to a plurality of objects and for providing time base electrical signals corresponding thereto, said range finding means including first through nth elements disposed in parallel to each other which measure said distances;
    range and element position data arithmetic means for producing range data of the camera to the objects and for producing element position data of active ones of said first through nth elements, in response to said time base electrical signal;
    object speed arithmetic means for producing time base speed signals corresponding to the speed of said objects, in response to said range data and said element position data; and
    object speed rank order decision means for comparing said time base speed signals corresponding to said objects and for determining the order of ranking of said speeds of said objects relative to each other.

16. An automatic focusing camera according to claim 15, wherein said elements are luminous elements that transmit light to said objects.

17. An automatic focusing camera according to claim 16, wherein said range finding means further includes element position detecting light receiving means for receiving said transmitted light reflected from said objects and for producing said time base electrical signals in response thereto.

18. An automatic focusing camera according to claim 16, wherein there are six said luminous elements.

19. An automatic focusing camera according to claim 15, wherein said elements include light receiving elements which detect light reflected from said objects.

20. An automatic focusing camera according to claim 15, wherein said range and element position data arithmetic means includes analog-to-digital converter means for converting said time base electrical signals to digital signals containing said range data and said element position data, in correspondence with the intensity of said time base electrical signals.

21. An automatic focusing camera according to claim 15, further including range and element position data storage means for storing said range data and said element position data from said range and element position data arithmetic means.

22. An automatic focusing camera according to claim 15, wherein said object speed arithmetic means includes means for computing the change of position of said objects with a change along a time base, in response to said range data and said element position data, so as to produce said time base speed signals.

23. An automatic focusing camera according to claim 22, further including a plurality of object speed processor means supplying output signals corresponding to optimum exposure times and stop values of respective objects to said object speed rank order decision means, in response to said time base speed signals and luminances of said objects, each object speed processor means corresponding to a different object and being supplied with a luminance signal corresponding to luminance of the respective object and the time base speed signal corresponding to the respective object.

24. An automatic focusing camera according to claim 23, further including photometric means for measuring the luminance of each said object and for supplying the luminance signals to said object speed processors in response thereto.

25. An automatic focusing camera according to claim 24, further including a shutter capable of opening and closing a shutter aperture, and shutter control means for controlling opening and closing of said shutter in accordance with the speeds of said objects at such time.

26. An automatic focusing camera according to claim 25, further including object speed data organizing means for controlling said shutter control means in response to said object speed rank order decision means so as to control said shutter control means in accordance with the highest speed object.

27. An automatic focusing camera according to claim 26, further including range forecasting means for forecasting the positions of said objects in a scene at a predetermined future time, in response to said time base speed signals and said element position data.

28. An automatic focusing camera according to claim 27, further including central processing means for supplying a mode signal to said object speed data organizing means so as to control said shutter control means in response to said range forecasting means.

29. An automatic focusing camera according to claim 27, further including a camera lens and focus drive means for controlling focusing of said lens.

30. An automatic focusing camera according to claim 29, further including focus decision means for producing a focus signal in response to said shutter control means, said central processing means supplying said focus signal from said focus decision means to said focus drive means.

31. An automatic focusing camera according to claim 28, further including mode selection button means for supplying a signal to said central processing means in dependence on the object being viewed.

32. An automatic focusing camera according to claim 15, further including a shutter capable of opening and closing a shutter aperture, and shutter control means for controlling opening and closing of said shutter in accordance with the speed of said object at such time.

33. An automatic focusing camera comprising:
a shutter capable of opening and closing a shutter aperture;
range finding means for measuring the distances of said camera to a plurality of objects and for providing time base electrical signals corresponding thereto, said range finding means including first through nth luminous elements disposed in parallel to each other and which transmit light to said objects to measure said distances;
range and element position data arithmetic means for producing range data of the camera to the objects and for producing element position data of active ones of said first through nth elements, in response to said time base electrical signal;
object speed arithmetic means for producing time base speed signals corresponding to the speed of said objects, in response to said range data and said element position data;
shutter control means for controlling opening and closing of said shutter in accordance with the speeds of said objects at such time;
a plurality of object speed processor means for supplying output signals corresponding to optimum exposure times and stop values of respective objects in response to said time base speed signals and luminances of said objects, each object speed processor means corresponding to a different object and being supplied with a luminance signal corresponding to luminance of the respective object and the time base speed signal corresponding to the respective object;
object speed rank order decision means for comparing said output signals from said plurality of object speed processor means and for determining the order of ranking of said speeds of said objects relative to each other; and
object speed data organizing means for controlling said shutter control means in response to said object speed rank order decision means so as to control said shutter control means in accordance with the highest speed object.

34. An automatic focusing camera according to claim 33, wherein said range and element position data arithmetic means includes analog-to-digital converter means for converting said time base electrical signals to digital signals containing said range data and said element position data, in correspondence with the intensity of said time base electrical signals.

35. An automatic focusing camera according to claim 33, further including range and element position data storage means for storing said range data and said element position data from said range and element position data arithmetic means.

36. An automatic focusing camera according to claim 33, wherein said object speed arithmetic means includes means for computing the change of position of said objects with a change along a time base, in response to said range data and said element position data, so as to produce said time base speed signals.

37. An automatic focusing camera according to claim 33, further including photometric means for measuring the luminance of each said object and for supplying the luminance signals to said object speed processors in response thereto.

38. An automatic focusing camera according to claim 33, further including range forecasting means for forecasting the positions of said objects in a scene at a predetermined future time, in response to said time base speed signals and said element position data.

39. An automatic focusing camera according to claim 38, further including central processing means for supplying a mode signal to said object speed data organizing means so as to control said shutter control means in response to said range forecasting means.

40. An automatic focusing camera according to claim 39, further including a camera lens and focus drive means for controlling focusing of said lens.

41. An automatic focusing camera according to claim 40, further including focus decision means for producing a focus signal in response to said shutter control means, said central processing means supplying said focus signal from said focus decision means to said focus drive means.

42. An automatic focusing camera according to claim 39, further including mode selection button means for supplying a signal to said central processing means in dependence on the object being viewed.

43. An automatic focusing camera comprising:
  a shutter capable of opening and closing a shutter aperture;
  range finding means for measuring the distances of said camera to a plurality of objects and for providing time base electrical signals corresponding thereto, said range finding means including first through nth luminous elements disposed in parallel to each other and which transmit light to said objects to measure said distances;
  range and element position data arithmetic means for producing range data of the camera to the objects and for producing element position data of active ones of said first through nth elements, in response to said time base electrical signal;
  range and element position data storage means for storing said range data and said element position data from said range and element position data arithmetic means;
  object speed arithmetic means for producing time base speed signals corresponding to the speed of said objects, in response to said stored range data and said element position data;
  shutter control means for controlling opening and closing of said shutter in accordance with the speeds of said objects at such time;
  range forecasting means for forecasting the positions of said objects in a scene at a predetermined future time, in response to said time base speed signals and said element position data;
  photometric means for measuring the luminance of each said object and for supplying the luminance signals to said object speed processors in response thereto;
  a plurality of object speed processor means for supplying output signals corresponding to optimum exposure times and stop values of respective objects in response to said time base speed signals and the luminances of said objects, each object speed processor means corresponding to a different object and being supplied with a luminance signal corresponding to luminance of the respective object and the time base speed signal corresponding to the respective object;
  object speed rank order decision means for comparing said output signals from said plurality of object speed processor means and for determining the order of ranking of said speeds of said objects relative to each other;
  object speed data organizing means for controlling said shutter control means in response to said object speed rank order decision means so as to control said shutter control means in accordance with the highest speed object;
  a camera lens;
  focus drive means for controlling focusing of said lens;
  focus decision means for producing a focus signal in response to said shutter control means, said central processing means supplying said focus signal from said focus decision means to said focus drive means;
  mode selection button means for supplying a signal to said central processing means in dependence on the object being viewed; and
  central processing means for supplying a mode signal to said object speed data organizing means so as to control said shutter control means in response to said range forecasting means and said mode selection button means, and for supplying said focus signal from said focus decision means to said focus drive means.

* * * * *